United States Patent [19]

Liu et al.

[11] Patent Number: 6,032,539

[45] Date of Patent: *Mar. 7, 2000

[54] MULTIPHASE FLOW MEASUREMENT METHOD AND APPARATUS

[75] Inventors: Ke Tien Liu, Rowland Heights; William Rieken, Bakersfield, both of Calif.

[73] Assignee: Accuflow, Inc., Rowland Heights, Calif.

[ * ] Notice: This patent is subject to a terminal disclaimer.

[21] Appl. No.: 08/926,645

[22] Filed: Sep. 10, 1997

Related U.S. Application Data

[60] Provisional application No. 60/028,030, Oct. 8, 1996.

[51] Int. Cl.[7] ........................................................ G01F 1/74
[52] U.S. Cl. ............................................................ 73/861.04
[58] Field of Search ............................ 73/861.04, 861.06

[56] References Cited

U.S. PATENT DOCUMENTS

| | | | |
|---|---|---|---|
| 2,882,995 | 4/1959 | Smith | 73/861.04 |
| 4,429,581 | 2/1984 | Furmaga | 73/861.04 |
| 4,596,136 | 6/1986 | Zacharias | 73/61.1 R |
| 4,688,418 | 8/1987 | Cheung et al. | 73/200 |
| 4,760,742 | 8/1988 | Hatton | 73/861.04 |
| 4,773,257 | 9/1988 | Aslesen et al. | 73/61.1 R |
| 4,852,395 | 8/1989 | Kolpak | 73/861.04 |
| 5,211,842 | 5/1993 | Tuss et al. | 210/87 |
| 5,390,547 | 2/1995 | Liu | 73/861.04 |
| 5,741,977 | 4/1998 | Agar et al. | 73/861.04 |

*Primary Examiner*—Benjamin R. Fuller
*Assistant Examiner*—Jewel V. Thompson
*Attorney, Agent, or Firm*—Townsend and Townsend and Crew LLP

[57] ABSTRACT

The invention provides an apparatus (100) for separating at least a first component (e.g., liquid, etc.) from a second component (e.g, gas or vapor, etc.) from a multiphase fluid during non-ideal flows such as plug flow operation. The apparatus (100) generally has a first line section (111) tangentially connected to the inlet flow line (105) and a second line section (117) coupled in series to the first line section (111). The second line section (117) includes an upper portion and a lower portion, which are respectively coupled to an upper portion and a lower portion of the first line section. The first component is removed using a gas discharge line (119) connected to the second line section (117). A substantially horizontal line section (121) also connected to second line section (117) removes substantially liquids from the second line section (117).

55 Claims, 2 Drawing Sheets

MULTIPHASE FLOW MEASUREMENT METHOD AND APPARATUS

This application claims benefit of provisional application 60/028,030, filed Oct. 8, 1996.

BACKGROUND OF THE INVENTION

The present invention relates to the field of multiphase flow measurement. The invention is illustrated in one example with regard to the measurement of multiphase flow for a petroleum fluid, but it will be recognized that the invention will have a wider range of applicability. Merely by way of example, the invention may be applied in the food processing industry, measurement of wet steam, and others.

Industry utilizes or has proposed several methods to measure the production of individual oil wells. The conventional approach is to use a three-phase or two phase separator to separate the multi-phase fluid mixture into distinctive phases. In the case where a three-phase separator is employed, three separate outgoing streams (gas, water, and oil/water emulsion) are produced. Separate flow meters measure the respective flow rates of the outgoing streams of oil, water, and gas. An on-line "cut" meter determines the water content of the emulsion stream. The two-phase separator operates similarly to the three-phase separator except that the free water stream is omitted.

These test separators are relatively large in physical size, expensive to construct, and require an abundance of ancillary pressure control and flow regulating equipment. Accordingly, users of this approach do not provide the separators for an individual oil well. Instead, a single test separator services a group of wells. Each individual well is placed "on test" for a relatively short period of time, and its production is determined. After the well is removed from test, it is assumed that the production from the well does not vary substantially until the well is again placed on test.

Accordingly, a pioneering approach was developed by Ke-Tien Liu described in U.S. Pat. No. 5,390,547, entitled MULTIPHASE FLOW MEASUREMENT (hereinafter "Liu"), which is hereby incorporated by reference for all purposes. Liu describes a technique for measuring flow rates for a multiphase fluid flow for continuously and respectively measuring the quantities of one gas and one or two liquid components flowing concurrently in a common pipeline.

In Liu, the mixture delivered by a feed pipeline is separated into two separate streams of gas and liquid by a novel piping configuration. The system then measures the flow rate in each stream individually. If there are multiple liquid components in the liquid phase, an on-line liquid fraction meter determines the proportion of each liquid component. The piping system then combines the two flow streams to a common discharge pipeline. Thus, Liu provides a technique to determine respective flow rates in a multiphase fluid flow system that is continuous and accurate using an apparatus, which is compact, low cost, reliable, and requires little maintenance. This technique has been quite effective in the measurement of the production of petroleum products, e.g., oil, gas, etc.

Severe slug flow conditions, however, often cause additional difficulties in measuring multiphase fluid flow. Slug flow commonly occurs in most typical oil/gas production operations. In these operations, slug flow can occur as the production fluids (e.g., oil, gas, water, etc.) emerge from the bottom of the oil well and flow into the wellhead under a variety of circumstances. Slug flow can also occur during the transportation of fluid through a hilly terrain. During slug flow, the instantaneous flow rate of the fluid in the surface flow line can be as much as several times greater than the average flow rate. In most cases, slug flow prevents conventional techniques from measuring flow rates accurately.

One measurement device in a multiphase metering system is the liquid fraction meter that measures the proportion of liquid components, such as oil and water, in the liquid phase. Using crude oil production measurement as an example, the water fraction meters include those based on capacitance measurement, microwave techniques, and density difference principles. Regardless of what type of water fraction meters are used, their performances are affected by such factors as crude oil type, temperature, pressure, salinity of produced water, etc. These process conditions often vary from time to time. Therefore, to obtain the most accurate measurement, the water fraction meter must be calibrated frequently. Conventionally, these types of meters are calibrated off-line, that is, the meter is isolated or removed from the process environment, then the meter is calibrated with known, well characterized standard fluids. Accordingly, off-line calibration is generally tedious, time-consuming, costly, and prone to making mistakes.

From the above it is seen that a continuous and accurate multi-phase flow measurement apparatus that is compact, low cost, reliable, and requires little maintenance is desired.

SUMMARY OF THE INVENTION

The present invention provides a technique including a method and apparatus for multi-phase fluid flow. The technique provides a method and apparatus for separating a gas from a liquid during non-ideal conditions, e.g., slug flow, etc. The technique also provides a method and apparatus for providing on-line calibration of a liquid fraction meter such as a water cut analyzer and the like.

In a specific embodiment, the present invention provides an apparatus for separating at least a first component (e.g., liquid, etc.) from a second component (e.g, gas or vapor, etc.) from a multiphase fluid. The apparatus generally has a first line section (or pipe section) tangentially connected to the inlet flow line (or pipe section) and a second line section coupled in series to the first line section. The second line section includes an upper portion and a lower portion, which are respectively coupled to an upper portion and a lower portion of the first line section. The first component is removed using a gas discharge line connected to the second line section. A substantially horizontal line section also connected to second line section removes substantially liquids from the second line section.

In another aspect, a method for separating a first component and a second component in a multiphase fluid is provided. The method includes providing a multiphase fluid comprising a first component and a second component into a first chamber and separating a first portion of the first component from a second portion of the first component. A step of combining the first portion of the first component from the second portion of the first component in a second chamber is included. The method then has a step of separating a substantial portion of the second component from the first component in the second chamber and separating any remaining portion of the second component from the first component in a substantially horizontal line coupled to the second chamber, while maintaining a relatively constant liquid level in the substantially horizontal line. A further step of measuring a flow rate of the first component is then included.

In yet another embodiment, a technique for calibrating a liquid fraction meter is provided. This technique includes steps of introducing a first component comprising a water based phase and a petroleum based phase into a sample accumulator and separating the water based phase from the petroleum based phase, while monitoring a liquid level corresponding to the water based phase, until a selected liquid level is achieved. The technique then removes the water based phase from the chamber and measures a signal from the water based phase in a liquid fraction meter, e.g., a water fraction analyzer. The signal is used to calibrate the water cut analyzer.

A further understanding of the nature and advantages of the invention will become apparent by reference to the remaining portions of the specification and drawings.

DESCRIPTION OF SPECIFIC EMBODIMENTS

General Hardware Configuration

Figure 1:
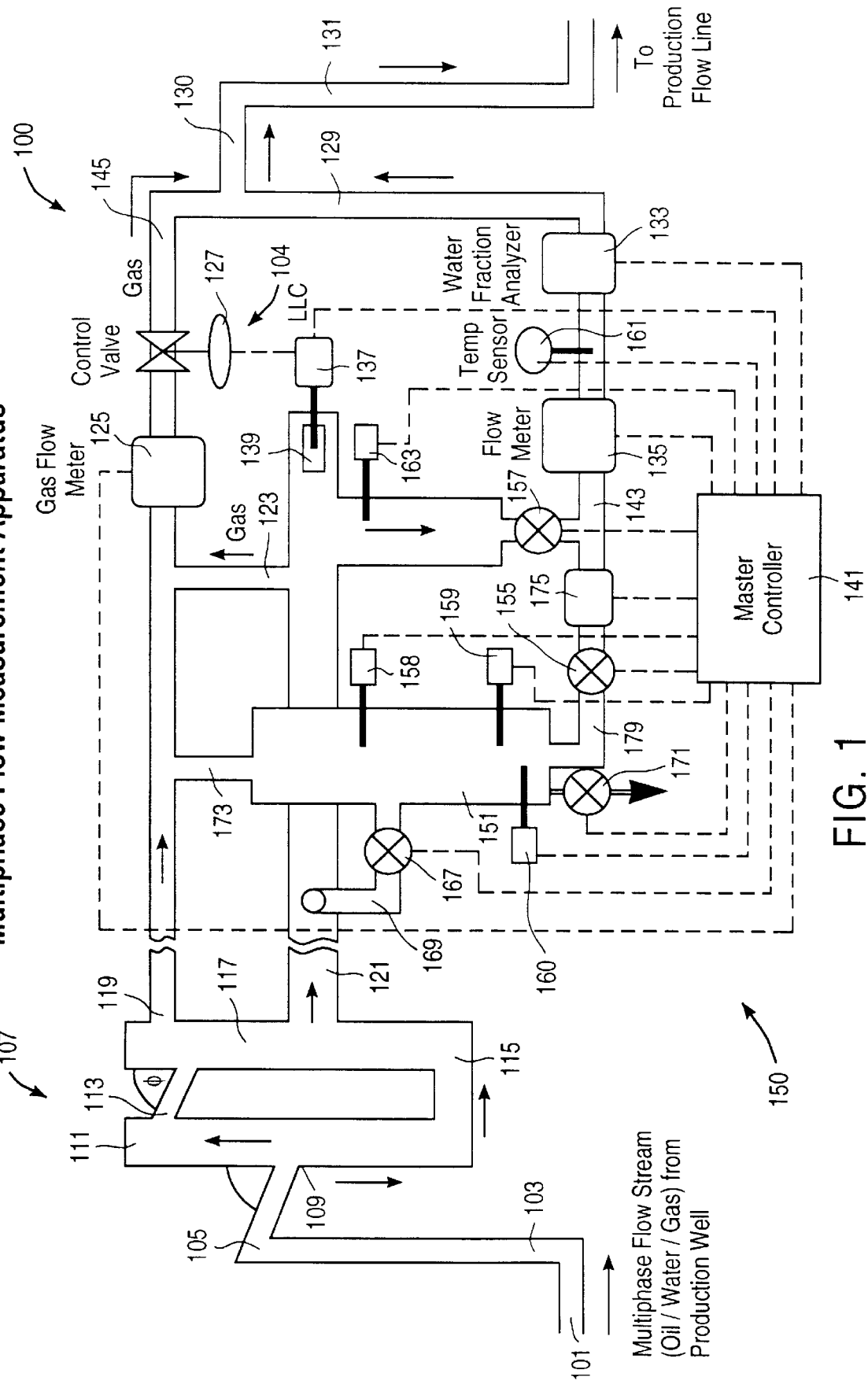
FIG. 1 is a simplified diagram of a multi-phase metering system according to the present invention.
Figure 1A:
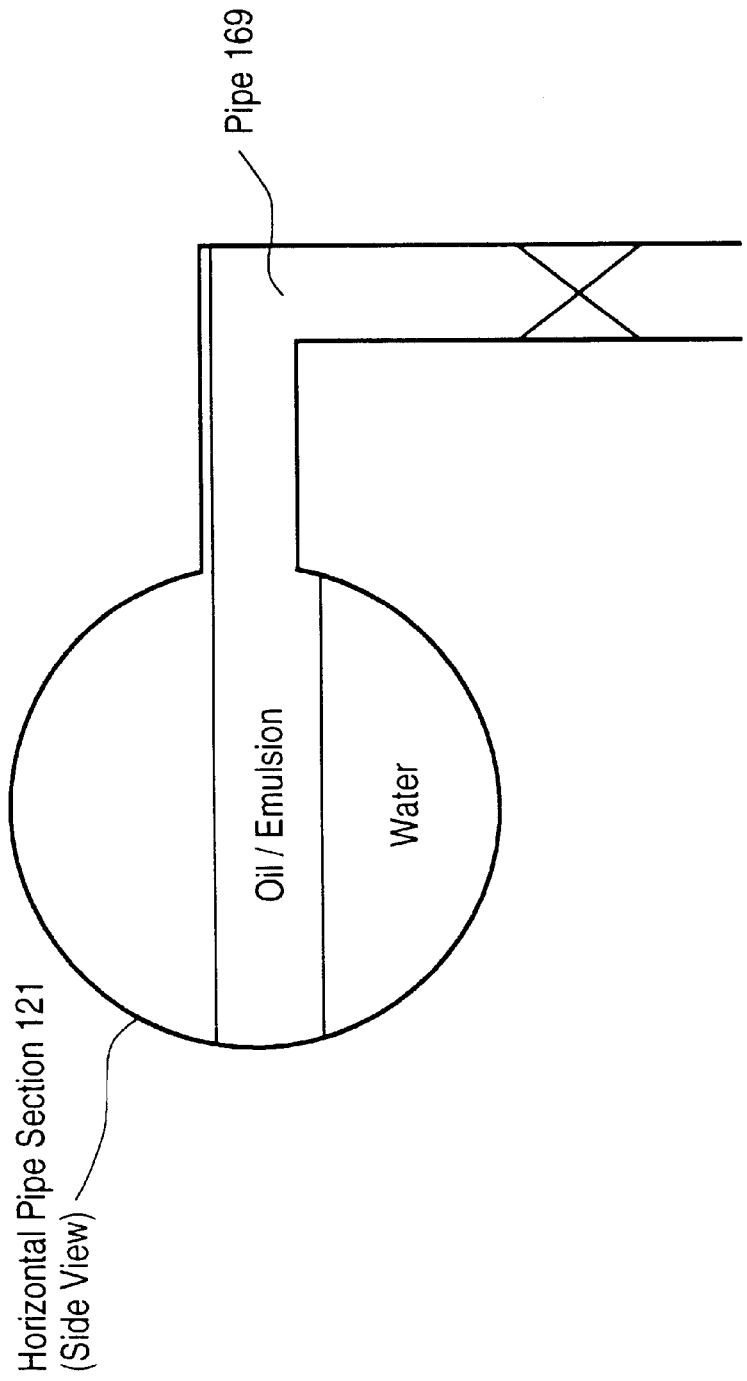
FIG. 1A is a more detailed view of the pipe of FIG. 1.

FIG. 1 is a simplified diagram of a multiphase system 100 according to the present invention. This multiphase system is merely an illustration and should not limit the scope of the claims defined herein. One of ordinary skill in the art would recognize other variations, modifications, and alternatives to this system.

The multiphase system 100 generally includes a gas eliminator assembly 107, a liquid level control mechanism 104, gas discharge lines 119, 123, 145, a gas flow meter 125, a liquid discharge line 129, a liquid flow meter 135, a liquid fraction meter system 150, and other elements. Generally, the gas eliminator assembly 107 separates the liquid and gaseous components from a multiphase petroleum production stream 101. The gas flow meter 125 measures the gas flow rate, while the liquid flow meter/liquid phase fraction meter measures respective liquid flow rates. These streams are recombined and discharged back into the production flow line 131.

In one specific embodiment, a multiphase petroleum production stream flows from production flow lines 101, 103 to an inlet pipe 105, where the longitudinal axis of the inlet pipe can be angled or substantially horizontal to the gas eliminator assembly 107 depending upon the application. The inlet pipe 105 is tangentially connected to the first vertical pipe section 111 of the gas eliminator assembly.

In one embodiment, the inlet pipe is angled downward to direct fluid flow towards the gas eliminator assembly 107. This tends to enhance separation of the gas and liquid phases and cause the heavier components (e.g, liquid, etc.) of the multiphase fluid stream to flow toward the bottom, while the lighter components (e.g., vapor, gas, etc.) separate from these heavier components and rise toward a top portion of the gas eliminator assembly 107. The angle θ ranges from about 45° to about 90°. Of course, the angle can be adjusted for the application.

The gas eliminator assembly includes at least two substantially vertical pipe sections 111, 117 (parallel to the direction of gravity) and at least two pipe sections 113, 115, connecting the two vertical pipe sections 111, 117 together. In one embodiment, the pipe section 115 is connected downward and tangentially to the second vertical pipe section 117 at an angle θ ranging from about 45° to 90°. Of course, the angle can be adjusted for the application. Additionally, although this system uses two vertical pipe sections, more than two sections can be used. In other embodiments, more than two horizontal pipe sections also may be used depending upon the application. In yet other embodiments, the vertical pipe sections can be at angles, which are generally directed towards the direction of gravity. That is, the vertical pipe sections do not need to be completely parallel to the direction of gravity.

A substantially horizontal pipe section 121 is attached to a middle portion of the vertical pipe section 117. The cross-section (e.g., diameter, length, etc.) of the vertical pipe section can be the same as or different from the cross-section of the horizontal pipe section, depending upon the application.

In most embodiments, the entire gas eliminator assembly is constructed with commercial grade steel pipes and fittings. The cross-section of the gas eliminating pipe assembly is often larger than that of the inlet pipe 105, and its absolute size will depend heavily on the application.

A first gas discharge pipe 119 connects to an upper portion of the vertical pipe section 117 of the gas eliminator assembly. A second gas discharge pipe 123 connects an upper portion of the horizontal pipe section 121 of the gas eliminator to the first gas discharge pipe 119.

A conventional gas flow meter 125, such as an orifice meter, a turbine meter, or a vortex shedding meter, is located in the gas discharge pipe 119. The gas flow meter measures the amount of gas, which flows from the gas discharge line. Of course, the flow meter used will depend upon the application.

Liquid level in the horizontal pipe section 121 is maintained at a relatively constant level with a level control assembly 104, including a liquid level sensing device 139, a transducer 137, a controller 141, and a control valve 127 located in the gas flow line 145 downstream of the gas flow meter 125.

In a preferred embodiment, the system includes an on-line calibrating liquid fraction meter system 150 in the flow stream. The liquid fraction meter system can accurately determine the relative content of a first component to a second component in the liquid and calibrate itself "on-line". An example of these components would include water as the first component and a petroleum product such as crude oil as the second component. The liquid fraction meter system 150 includes elements such as a sample accumulator 151 (or separation chamber), a first liquid discharge line 153, a flow meter 135, interface level probes 158, 159, and 163, a liquid level probe 160, a programmable logic controller 141, a liquid fraction analyzer 133, valves 155, 157, 171, and others.

The sample accumulator 151 is located downstream on the horizontal pipe section 121 and is used to separate the first component from the second component via gravity. That is, two separable components, such as a petroleum product and water, separate in the sample accumulator via differences in specific gravity. The sample accumulator 151 is a vertical section of pipe (or vessel), which is connected to the horizontal pipe section 121 at one end and is connected to a second liquid discharge line 143 at the other end.

The interface probes 158 and 159 in the sample accumulator 151 and the interface probe 163 in the pipe section 153 are used to detect the interface level of the heavier liquid component (such as water) and the mixture of both liquid components (such as oil/water emulsion) or the lighter liquid component. An example of such interface probe is the capacitance level probe manufactured by Endress+Hauser or Drexelbrook Engineering, but can be others. The liquid level probe 160 is capable of detecting gas/liquid level in the sample accumulator. An example of such device is the ultrasonic level probe manufactured by Endress+Hauser, but can be others.

The interface level probe 159 monitors the required level of either the first component or the second component, while the control valve (or block valve) 155 is shut. The control valve 155 is located between the lower portion of the separation chamber 151 and the second liquid discharge line 143. Further details with regard to the separation technique will be discussed below.

Running parallel with the sample accumulator 151 is the first liquid discharge line 153. The first liquid discharge line connects the horizontal pipe section 121 to the second liquid discharge line 143. A control valve (or block valve) 157 is located between the first 153 and second 143 liquid discharge lines.

A conventional liquid flow meter 135, such as a turbine meter, a positive displacement meter, or a Coriolis mass flow meter connects to second discharge line 143, which measures the flow rate of the liquid mixture stream. A liquid fraction meter 133 connects downstream of the liquid flow meter 135. A temperature sensor 161 is located near the liquid fraction meter 133.

In an oil production flow line, the liquid fraction meter is commonly referred to as a "water fraction analyzer". Examples of some of the water fraction analyzer include those based on capacitance measurement, microwave measurement, radio frequency energy absorption, and density differential principles. When a Coriolis force flow meter is employed as a liquid flow meter, it can simultaneously serve as a water cut analyzer because this type of flow meter also provides density measurement of the liquid mixture, as described in U.S. Pat. Nos. 4,773,257 and 4,689,989, incorporated herein by reference for all purposes.

After exiting from the liquid fraction meter 133, the liquid mixture flows upwardly through a riser pipe 129 and combines with the gas flowing from a gas outlet pipe 145. The recombined multiphase stream is discharged through a horizontal flow pipe 130. The longitudinal axis of pipe 130 is higher than the liquid flow meter 135 and water cut meter 133 to keep these instruments liquid-filled at substantially all times.

The system is monitored by and/or controlled by a master controller 141. The master controller can be any suitable programmable logic controller (PLC), personal computer, or equivalent. It may regulate flow into/out of the system and monitor/calculate relative flow rates, combined flow rates and other data. The master controller may take any one of a variety of forms including, for example, an appropriately controlled microprocessor, dedicated hardware, or the like. In some embodiments, the master controller may also perform operations such as cumulative volume calculation, data recordation, and data transmission to a remote site.

The hardware is merely an example of the present invention. Other hardware configurations can be used depending upon the specific application. For instance, the present gas eliminator assembly can be applied to wet steam measurement and others. Of course, one of ordinary skill in the art would recognize other variations, modifications, and alternatives to the embodiments shown above.

General Process Operation

The process operation that will be described is merely a simplified example according to the present invention. This process operation should not limit the scope of the claims defined herein. One of ordinary skill in the art would recognize other variations, modifications, and alternatives to this system.

In operation, multiphase fluid enters inlet line 101, traverses upwardly through line 103, and enters the gas eliminator assembly 107 through inlet line 105. As the multiphase fluid enters into the gas eliminator assembly, most of the large gas bubbles separate from the liquid, move upward, and eventually exit through line 113 to the gas discharge line 119. The tangential entry design of the inlet pipe 105 causes the incoming multiphase fluid mixture to be directed into the liquid in the lower portion of the vertical pipe section and "swirl". This swirling action tends to enhance the separation of the liquids from the gases in the multiphase fluid.

In slug flow operation, a large volume (e.g., about two times greater or more of the average flow rate, etc.) of multiphase fluid enters an upper portion 111 of the vertical pipe section. As this large volume of multiphase fluid enters this pipe section, some of the large gas bubbles separate from the liquid, move upward and across through the horizontal pipe section 113 into the second vertical pipe section 117. A certain amount of liquid, however, also would be carried upward with gas bubbles through the pipe section 113.

As this carried-over liquid enters the second vertical pipe section 117, substantially all of the liquid separates from the gas in the second vertical pipe section and enters the horizontal pipe section 121. In this second vertical pipe section 117, the liquid gets another chance to separate from the gas phase. In conventional gas eliminator assemblies, the liquid would carry over into the gas discharge line 119, which is clearly undesirable for purposes of separating liquids from gases in the multiphase fluid.

The pipe section 113 (or upper pipe section) tangentially connects to the second vertical pipe section 117 at a slight downward angle from the horizontal. This downward angle tends to direct the liquid toward the horizontal pipe section 121, allowing gas to rise up through the gas discharge line 119. This angle ranges from about 45° to about 90°. Preferably the angle is about 60° to 70°. Of course, the angle used depends upon the application.

A certain amount of small gas bubbles, however, will often not be effectively separated with these features alone. These small gas bubbles are carried downward by the liquid stream in the first vertical pipe section 109, pass through the U-shaped pipe section 115, and flow into the horizontal pipe section 121 of the gas eliminator assembly.

The horizontal section of the gas eliminator provides a desirable environment for these small gas bubbles to be effectively and completely removed because: 1) the flow stream in this section is smooth and calm (due to its large diameter); 2) the liquid layer through which the gas bubbles need to rise is thin; and 3) the effective liquid/gas surface area for the gas bubbles to escape is large. The liquid stream is essentially gas-free as it is discharged from the gas eliminator assembly.

For applications where more liquid retention time is required to achieve complete gas removal, such as in situations where gas bubbles are very small or liquid viscosity is very high, a long length of the horizontal section can be used with minimum incremental cost. There is virtually no restriction regarding the length, the layout and the configuration of the horizontal section. The horizontal section can be constructed in a straight line, or in looping or serpentine configurations to preserve space. The length can also be from 1 to 200 feet, but preferably between 10 to 60 feet in typical oil field operations.

Alternatively, the following design guideline provides a minimum length ($L_{min}$) of the horizontal section:

$$L_{min} = V \, t_{gas} \tag{1}$$

where v is the velocity of the liquid in the horizontal section and $t_{gas}$ is the gas bubble rising time. Stoke's Law estimates the gas bubble rising time as follows:

$$t_{gas} = 4.664 \times 10^4 \frac{H \mu_{liq}}{S_{liq} d_{gas}^2} \qquad (2)$$

where:

$t_{gas}$=time for the gas bubble to rise from the bottom of the pipe to the liquid surface,
H=height of liquid in the horizontal pipe,
$\mu_{liq}$=viscosity of liquid,
$S_{liq}$=Specific gravity of liquid,
$d_{gas}$=diameter of gas bubble.

For example, a well producing 1000 barrels of liquid (oil plus water) per day includes a 6-inch diameter horizontal pipe and a liquid level controlled at a 4-inch height (i.e., H=4 inches). Other process conditions are: liquid viscosity ($\mu_{liq}$) at 5 centipoise; specific gravity of liquid ($S_{liq}$) at 0.9; and diameter of the smallest gas bubbles at 150 microns. Based on these conditions, liquid velocity (v), is at 0.47 ft/sec, and Stoke's Law calculates gas bubble rising time ($t_{gas}$) at 46.1 seconds. From the liquid velocity and gas bubble rising time, the design guideline provides a minimum length ($L_{min}$) of the horizontal section at 21.7 feet.

The small gas bubbles separate from the liquid phase in the horizontal pipe section and rise through the second gas discharge line 123. In other embodiments, the piping structure can include more than one gas discharge line connecting the horizontal pipe section 121 to the gas discharge line 119 for effective separation between the two phases. Of course, this will depend upon the application.

The liquid level mechanism 127, 137, 139, 141 regulates the liquid level in the horizontal section at a relatively constant height. The liquid level sensor 139 detects the liquid level in the horizontal pipe. Depending on the liquid level, the control valve 127 will open or close via the liquid level controller and master controller. If the liquid level is below the desired set point, the controller 141 sends a signal to open the control valve 127. If the liquid level is higher than the desired set point, then the valve will partially or completely close. Pressure in the gas space in the horizontal section will therefore rise slightly, forcing the rate of liquid discharge to increase thus lowering the liquid level. If the level is near the set point, the gas control valve will be partially open.

In preferred embodiments, the system uses on-line automatic calibration for the water fraction analyzer. This on-line calibration of the water fraction analyzer ensures measurement accuracy of the liquid phases, e.g. petroleum, water, etc. The water fraction analyzer becomes even more important when the amount of water in the liquid is relatively large (e.g., more than 80% water), as compared to the petroleum product such as crude oil, since the crude being produced must be measured accurately for the efficient production of an oil well.

In a normal mode of operation, the liquid phase flows through the horizontal pipe section 121, through the first liquid discharge line 153, through the second liquid discharge line 143, through the flow meter 135, temperature sensor 161, and the water fraction analyzer 133, before it combines with the gas phase. In providing this operation, the control valve 155 is closed and control valve 157 is opened, allowing flow therethrough. Further, control valve 171 is closed and control valve 167 is either opened or closed.

To calibrate the water cut analyzer to a dry oil standard, the sample accumulator 151 must first be purged. In particular, control valve 155, and control valves 157, and 167 are closed to force the liquid in the sample accumulator 151 to be purged through liquid discharge pipes 179 and 143. Liquid level in the sample accumulator decreases as the purging process continues. Liquid purging is stopped when the liquid level reaches a desired low set point detected by liquid level probe 160. Control valves 157 and 167 are opened and control valve 155 is closed to allow fresh liquids to flow from the horizontal pipe section 121 to the sample accumulator 151 through connecting pipe 169. The connecting pipe 169 is attached to the side of the horizontal pipe section 121 near the center between the top and bottom of the pipe to allow more oil or emulsion phase to be withdrawn to the sample accumulator. After the sample accumulator is filled with liquids, control valves 157 and 167 are closed and control valve 155 is opened to repeat liquid purging operation. The purging operation may be repeated several times to ensure the liquids previously accumulated in the sample accumulator are completely displaced with the fresh liquids.

After the liquids in the sample accumulator are sufficiently purged, control valves 157 and 167 are opened and control valve 155 is closed to resume operation in the normal mode.

During this time, the separable liquids comprising oil and water in the sample accumulator separate from each other via gravity and difference in density. Being the heavier (or denser) of these two components, water settles to the bottom of the sample accumulator. Above the water phase is the so called "emulsion" phase. The water phase is substantially free of oil, but the emulsion phase would contain oil with a certain amount of water. As time progresses, some or all of the water in the emulsion phase would be separated and settle to the water phase. The interface probe 159 provides indication of the height of the emulsion/water interface.

When the emulsion/water interface in the sample accumulator reaches a desired high set point detected by the interface probe 158, an electronic signal is sent from the interface probe to the master controller which opens control valve 155 and closes control valve 157 simultaneously to allow the water to drain out from the bottom section of the sample accumulator. As the water drains, the height of the emulsion/water interface level decreases and more fresh liquids flow into the sample accumulator through connecting pipe 169. When the emulsion/water interface reaches a desired low set point detected by interface level probe 159, an electronic signal is sent from the interface probe 159 to the master controller 141 that closes control valve 155 and opens control valve 157 to stop water draining operations. The liquids in the sample accumulator is again allowed to stand and consequently the height of the emulsion/water interface level increases. When the emulsion/water interface level reaches the desired high set point again (as detected by interface probe 158), water draining operations are repeated. With the repeated water draining operations, the amount of emulsion phase increases in the sample accumulator.

An alternative water draining method can also be adopted. In this case, control valve 155 remains closed during the water draining operation. Instead of draining the water through control valve 155, water is drained through control valve 171 to an external waste liquid collection facility or the like. When the emulsion/water interface in the sample accumulator reaches a desired high set point detected by the interface probe 158, an electronic signal is sent from the interface probe to the master controller 141 which opens control valve 171 to allow the water to drain out from the bottom section of the sample accumulator. As the water drains, the emulsion/water interface level decreases and more fresh liquids flow into the sample accumulator through connecting pipe 169. When the emulsion/water interface reaches a desired low set point detected by interface level probe 159, an electronic signal is sent from the interface probe 159 to the master controller 141, that closes control valve 171 to stop water draining operations. The liquid in the sample accumulator is again allowed to stand and the emulsion/water interface level increases. When the interface level reaches the desired high set point again (as detected by interface level probe 158), water draining operations are repeated. With these repeated water draining operations, the amount of emulsion phase increases in the sample accumulator.

One criterion to terminate water draining operations may be related to a condition when the time interval between successive water draining exceeds a predetermined time period. Of course, the criterion may vary with different applications.

After a sufficient amount of emulsion phase is accumulated, control valves 157 and 171 are closed, and control valve 155 is opened to allow the emulsion phase in the sample accumulator to flow through liquid discharge line 179, the reference water cut meter 175, liquid discharge line 143, flow meter 135, temperature sensor 161, and water fraction analyzer 133. Control valve 167 is preferably closed to prevent the fresh liquids in the horizontal pipe section 121 from flowing into the sample accumulator during the subsequent calibration steps.

It should be mentioned that the reference water cut meter 175 provides accurate measurement of water content in the emulsion phase as long as emulsion is an "oil-continuous" emulsion, a type of oil/water emulsion in which water droplets are dispersed and surrounded by a continuous medium of oil phase. The oil/water emulsion resulting from static settling process described herein is typically an oil-continuous emulsion. Water cut in the oil-continuous emulsion can range from 0 to about 80 percent, but more typically it ranges from 0 to about 20 percent. An example of the reference water cut meter suitable for measuring oil-continuous emulsion is the capacitance-type meter manufactured by equipment suppliers such as Hydril, Halliburton, or Basic. It should be mentioned that this type of reference water cut meter is not suitable as a replacement of the water fraction analyzer 133 which requires a full 0 to 100 percent water cut operating range.

Readings from the reference water cut meter 175, the water fraction analyzer 133, and temperature sensor are recorded simultaneously at the time when the emulsion flows through these instruments. The output signal from the water cut mater 175 is used to calibrate the oil standard value of the water fraction analyzer 133; that is, "zero" the water fraction analyzer. Proper temperature adjustment of the signals from the reference water cut meter and the water fraction analyzer with the reading from temperature sensor 161 may be necessary.

In one preferred embodiment, besides being utilized as a flow meter, a Coriolis meter, such as that manufactured by Micro Motion, Inc. located in Boulder, Colo., can also be used as a water fraction analyzer. The operating principle of this device is to utilize the density difference between oil and water as a mean to measure water cut. Since the Coriolis meter also measures the combined density of the oil/water flowing stream, water cut in the oil/water mixture can be deduced when the densities of the dry oil and water are known. The purpose of the on/line calibration operation is therefore to determine the densities of the dry oil and water prior to performing multiphase flow measurement.

Therefore, in this particular embodiment, Coriolis meter combines the functionality of flow meter 135, and water fraction analyzer 133 into a single instrument. For illustration purpose, the Coriolis meter is herein referred to as component 135. A separate water fraction analyzer designation 133 is therefore not needed in this case.

Specifically, to perform on-line calibration of a dry oil standard when a Coriolis meter is employed, the value of the density of the emulsion phase is obtained from the Coriolis meter 135 at the time the emulsion flows through the Coriolis meter. Simultaneously, temperature reading from the temperature sensor 161 is also recorded. Alternatively, temperature of the emulsion can also be obtained from a temperature sensor internally incorporated in the Coriolis meter. Further, the signal from the reference water cut meter 175 is also recorded. The master controller 141 then computes the dry oil density based on the recorded values of emulsion density, emulsion temperature, water cut in the emulsion as well as density of water, using a proper computation algorithm. (Note that the on-line determination of water density will be described later.) The calculated dry oil density is then programmed into the master controller 141 as one of the input parameters for the water fraction analyzer. On-line calibration of the water fraction analyzer to a dry oil standard is now complete.

During calibration operation, liquid level in the sample accumulator decreases. When the liquid level reaches a desired low set point detected by liquid level probe 160, control valves 157 and 167 are opened, and control valve 155 resumes operation in the normal mode.

The dry oil calibration procedures may be repeated several times until a consistent calibration value is obtained.

To calibrate the water fraction analyzer to a water standard, the sample accumulator 151 must first be purged. In particular, control valves 155, 165, and 167 are opened, and control valve 157 is closed to allow the fresh liquids to flow through sample accumulator 151. Once the sample accumulator is filled with fresh liquids, control valve 155 is closed and control valve 157 is opened, to resume operation in the normal mode. During this time, the separable liquids comprising oil and water in the sample accumulator separate from each other via gravity and difference in density. Being the heavier (or denser) of these two components, water settles to the bottom of the sample accumulator. Above the water layer is the so-called "emulsion" phase as described previously. When the water/emulsion interface in the sample accumulator rises and reaches a desired level detected by interface level probe 158, water accumulation operation is complete.

Control valve 155 is then opened and control valve 157 is closed, allowing the water in the sample accumulator, which is substantially free from oil or oil/water emulsion, to flow through the flow meter and the water fraction analyzer. A signal from the water fraction analyzer 133 is noted or stored in the master controller 141 at the time when water flows through it. The output signal is then used to calibrate (or "span") the water fraction analyzer.

In one embodiment where Coriolis meter is used as a flow meter as well as a water fraction analyzer, on-line calibration to a water standard involves obtaining density from the Coriolis meter, obtaining temperature reading from either the temperature sensor 161 or an integral temperature sensor in the Coriolis meter, correcting water density to a certain reference condition using a proper computation algorithm, then entering the calculated water density value to the master controller or other pertinent devices.

Upon completion, control valve 155 is closed and control valve 157 is opened, resuming normal operation.

An alternative water accumulation operation uses pipe section 153, rather than the sample accumulator 151, as a water sample accumulator. In particular, the system is set to operate in the normal operating mode for a period of time, i.e., control valves 155 and 167 are closed and control valve 157 is open to allow the liquid to flow through pipe section 153. Control valves 155 and 167 are then open and control valve 157 is closed to divert the liquid to flow through sample accumulator 151, and pipe sections 179 and 143, and allow the liquid content in the pipe section 153 to stand for a period of time. During this time, water settles to the bottom of pipe section 153 and the water/emulsion interface in this pipe section continues to rise as time progresses.

When the water/emulsion interface reaches a high level detected by interface probe 163, control valve 155 is closed, and control valve 157 is opened, allowing the liquid in the pipe section 153, which is substantially free from oil or oil/water emulsion, to flow through the flow meter and the water cut analyzer. A signal from the water fraction analyzer 133 is noted or stored in the master controller or the microprocessor of the water cut analyzer at the same time when water flows it. The output is then used to calibrate (or "span") the water cut analyzer.

In one embodiment where Coriolis meter is used as a flow meter, as well as a water cut analyzer, the same calibration procedure described previously is followed.

This on-line calibration process is repeated at desired intervals to ensure that the water cut analyzer is properly calibrated. For instance, this calibration process can occur daily, weekly, or monthly. Alternatively, the calibration process can occur at selected times during the day if needed. Of course, the frequency used to perform this calibration technique will depend upon the application. The programmable logic controller oversees all of these operations.

Once measurement of the gas stream and liquid stream has been made. Gases from the gas discharge line 145 is combined with the liquids from the liquid discharge line 129 to from the multiphase fluid. This multiphase fluid flows out of the system through lines 130 and 131. As shown, the multiphase fluid flow is returned back to the production flow line in the oil field.

Although the foregoing invention has been described in some detail by way of illustration and example, for purposes of clarity of understanding, it will be obvious that certain changes and modifications may be practiced within the scope of the appended claims.

The above description is illustrative and not restrictive. Many variations of the invention will become apparent to those of skill in the art upon review of this disclosure. Merely by way of example, the invention may be used to measure flow in many applications other than oil/water/gas applications. The scope of the invention should, therefore, be determined not with reference to the above description, but instead should be determined with reference to the appended claims along with their full scope of equivalents.

What is claimed is:

1. Apparatus for separating at least a first component from a second component from a multiphase fluid, said apparatus comprising:
    an inlet flow line;
    a first line section tangentially connected to said inlet flow line, said first line section including an upper portion and a lower portion;
    a second line section coupled in series to said first line section, said second line section including an upper portion and a lower portion, said upper portion of said second line section being coupled to said upper portion of said first line section, said lower portion of said second line section being coupled to said lower portion of said first line section;
    a gas discharge line connected to said second line section; and
    a substantially horizontal line section connected to said second line section.

2. Apparatus of claim 1 wherein said substantially horizontal line section has substantially a greater cross-section than said inlet flow line.

3. Apparatus of claim 1 wherein a third line section connects said upper portion of said first line section with said upper section of said second line section.

4. Apparatus of claim 1 wherein a third line section connects said upper portion of said first line section with said upper section of said second line section, said third line section tangentially connecting said upper section of said second line section at an angle.

5. Apparatus of claim 4 wherein a fourth line section connects said lower portion of said first line section with said lower portion of said second line section, said fourth line section being in parallel to said third line section.

6. Apparatus of claim 1 wherein said first line section is a substantially vertical pipe section.

7. Apparatus of claim 1 wherein said second line section is a substantially vertical pipe section.

8. Apparatus of claim 1 wherein said substantially horizontal pipe section includes a fifth pipe section coupling said substantially horizontal pipe section to said gas discharge line.

9. Apparatus of claim 1 further comprising:
    a first substantially vertical line section connected to a lower portion downstream on said substantially horizontal pipe section
    a valve disposed between said substantially horizontal pipe section and a water cut analyzer.

10. Apparatus of claim 1 further comprising a liquid discharge line connected to a lower portion downstream on said substantially horizontal pipe section.

11. Method for a multiphase fluid, said method comprising steps of:
    providing a multiphase fluid comprising a first component and a second component into a first chamber;
    separating a first portion of said first component from a second portion of said first component;
    combining said first portion of said first component from said second portion of said first component in a second chamber;
    separating a substantial portion of said second component from said first component in said second chamber;
    separating any remaining portion of said second component from said first component in a substantially horizontal line coupled to said second chamber, while maintaining a relatively constant liquid level in said substantially horizontal flow line; and
    measuring a flow rate of said first component.

12. Method of claim 11 further comprising a step of measuring a flow rate of said second component.

13. Method of claim 11 wherein said first chamber is a substantially vertical pipe.

14. Method of claim 11 wherein said second chamber is a substantially vertical pipe.

15. Method of claim 11 further comprising a steps of:
    introducing said first component comprising a water based phase and a petroleum based phase into a third chamber;

separating said water based phase from said petroleum based phase, while monitoring a liquid level corresponding to said water based phase, until a selected liquid level is achieved;

removing said water based phase from said third chamber; and measuring a signal from said water based phase in a water cut analyzer.

16. Method of claim 15 wherein said liquid level is monitored using a probe.

17. Method of claim 15 wherein said step of removing is provided by adjusting a valve to direct flow out of said third chamber.

18. Method of claim 15 wherein said step of introducing is provided by adjusting a valve to direct flow into said third chamber.

19. Method of claim 15 further comprising a step of using said signal to calibrate said water cut analyzer.

20. Method for multiphase flow, said method comprising:

providing a multiphase fluid comprising a gas phase and a liquid phase, said liquid phase comprising a water based phase and a petroleum based phase;

separating said gas phase from said liquid phase;

separating said water based phase from said petroleum based phase, while monitoring a liquid level corresponding to said water based phase, until a selected liquid level is achieved;

removing said water based phase from said third chamber; and measuring a signal from said water based phase in a water cut analyzer.

21. Method of claim 20 further comprising a step of using said signal of said water based phase as a standard in said water cut analyzing.

22. Fluid processing apparatus, said apparatus comprising:

an inlet flow line;

a first line section tangentially connected to said inlet flow line, said first line section including an upper portion and a lower portion;

a second line section coupled in series to said first line section, said second line section including an upper portion and a lower portion, said upper portion of said second line section being coupled to said upper portion of said first line section, said lower portion of said second line section being coupled to said lower portion of said first line section; and a substantially horizontal line section connected to said second line section.

23. Apparatus of claim 22, further comprising a gas discharge line coupled to said second line section.

24. Apparatus of claim 22, wherein said substantially horizontal line section has substantially a greater cross-section than said inlet flow line.

25. Apparatus of claim 22, wherein a third line section connects said upper portion of said first line section with said upper section of said second line section.

26. Apparatus of claim 22, wherein a third line section connects said upper portion of said first line section with said upper section of said second line section, said third line section tangentially connecting said upper section of said second line section at an angle.

27. Apparatus of claim 26, wherein a fourth line section connects said lower portion of said first line section with said lower portion of said second line section, said fourth line section being in parallel to said third line section.

28. Apparatus of claim 22, wherein said first line section is a substantially vertical pipe section.

29. Apparatus of claim 22, wherein said second line section is a substantially vertical pipe section.

30. Apparatus of claim 23, wherein said substantially horizontal line section includes a fifth pipe section coupling said substantially horizontal line section to said gas discharge line.

31. Apparatus of claim 22, further comprising:

a first substantially vertical line section connected to a lower portion downstream on said substantially horizontal line section;

a valve disposed between said substantially horizontal line section and a water cut analyzer.

32. Apparatus of claim 22, wherein the inlet flow line is angled downward to direct fluid flow to the first line section.

33. Apparatus of claim 22, wherein the angle is in the range from about 45° to 90°.

34. Apparatus of claim 22, wherein said gas discharge line is coupled to a gas flow meter.

35. Apparatus of claim 34, wherein the gas flow meter is selected from the group consisting of an orifice meter, a turbine meter, and a vortex shedding meter.

36. Apparatus of claim 22, wherein a liquid level in the horizontal line section is maintained relatively constant.

37. Apparatus of claim 22, wherein the horizontal line section is coupled to a sample accumulator used to separate the first component from the second component using gravity, a specific gravity of the first component being different from the specific gravity of the second component.

38. Apparatus of claim 37, wherein the sample accumulator comprises at least one probe to detect interface levels between the first component and the second component.

39. Apparatus of claim 22, further comprising a first liquid discharge line connected to a lower portion downstream on said substantially horizontal line section, the first liquid discharge line connecting the substantially horizontal line section to a second liquid discharge line.

40. Apparatus of claim 39, wherein a control valve is positioned between the first and second liquid discharge lines.

41. Apparatus of claim 39, wherein a liquid flow meter is coupled to said second liquid discharge line.

42. Apparatus of claim 39, wherein a liquid fraction meter is coupled to said second liquid discharge line.

43. Apparatus of claim 22, wherein said apparatus further comprises:

a programmable logic controller to regulate flow through the lines.

44. Apparatus of claim 43, wherein the programmable logic controller performs operations selected from the group consisting of cumulative volume calculations, data recordation, data transmission, flow rate calculations, and flow monitoring.

45. Method for a multiphase fluid, said method comprising steps of:

providing a multiphase fluid including a first component and a second component into a first chamber;

separating a first portion of said first component from a second portion of said first component;

combining said first portion of said first component from said second portion of said first component in a second chamber;

separating a substantial portion of said second component from said first component in said second chamber; and separating any remaining portion of said second component from said first component in a substantially horizontal line coupled to said second chamber, while maintaining a relatively constant liquid level in said substantially horizontal flow line.

46. Method of claim 45, further comprising a step of calculating a flow rate of said first component.

47. Method of claim 45, further comprising a step of measuring a flow rate of said second component.

48. Method of claim 45, wherein said first chamber is a substantially vertical pipe.

49. Method of claim 45, wherein said second chamber is a substantially vertical pipe.

50. Method of claim 45, further comprising the steps of:
introducing said first component comprising a water based phase and a petroleum based phase into a third chamber;
separating said water based phase from said petroleum based phase, while monitoring a liquid level corresponding to said water based phase, until a selected liquid level is achieved.

51. Method of claim 50, wherein said liquid level is monitored using a probe.

52. Method of claim 50, wherein said step of introducing is provided by adjusting a valve to direct flow into said third chamber.

53. Method of claim 50, further comprising the steps of:
removing said water based phase from said third chamber; and
measuring a signal from said water based phase in a water cut analyzer.

54. Method of claim 53, wherein said step of removing is provided by adjusting a valve to direct flow out of said third chamber.

55. Method of claim 53, further comprising a step of using said signal to calibrate said water cut analyzer.

* * * * *